United States Patent [19]

Helfert et al.

[11] 4,113,785

[45] Sep. 12, 1978

[54] POLYETHER POLYOLS AND METHOD OF PREPARING SAME

[75] Inventors: Herbert Helfert, Frankenthal, Fed. Rep. of Germany; Pauls Davis, Gibraltar; William Keith Langdon, Grosse Ile, both of Mich.

[73] Assignee: BASF Wyandotte Corporation, Wyandotte, Mich.

[21] Appl. No.: 736,959

[22] Filed: Oct. 29, 1976

[51] Int. Cl.[2] .................... C07C 41/02; C07C 43/10
[52] U.S. Cl. ......................... 260/615 B; 252/52 A; 252/306; 252/314; 252/351; 528/406
[58] Field of Search ............... 260/615 B, 2 R, 2 EP

[56] References Cited

U.S. PATENT DOCUMENTS

| 2,733,272 | 1/1956 | Horsley et al. ............... 260/615 B |
| 2,792,354 | 5/1957 | De Groote et al. ......... 260/615 B X |
| 2,990,396 | 6/1961 | Clark et al. .................. 260/2 EP X |

*Primary Examiner*—Howard T. Mars
*Attorney, Agent, or Firm*—Robert J. Henry; Bernhard R. Swick; Robert E. Dunn

[57] ABSTRACT

New polyether polyols of predetermined structure are prepared by reacting polyether bis alcoholates with selected bis epoxides. Specifically, a polyoxyalkylene glycol is converted to the bis alcoholate, and then the bis alcoholate is reacted with an equivalent amount of a glycol bis glycidyl ether, with the reactants being mixed together all at once. The polyether polyalcoholate thus obtained is converted to a high molecular weight polyether polyol by acid neutralization or ion exchange.

10 Claims, No Drawings

POLYETHER POLYOLS AND METHOD OF PREPARING SAME

BACKGROUND OF THE INVENTION

1. Field of the Invention

The present invention relates to a high molecular weight polyether polyol, and more particularly to a high molecular weight polyoxyalkylene polyol and the method of preparing same.

2. Description of the Prior Art

The maximum molecular weight of base catalyzed oxide polymer is limited by the ratio of the rate of propagation to transfer. Therefore, only limited molecular weights of these products can be achieved by a direct oxyalkylation reaction. To obtain products of higher molecular weight other chemical methods are necessary.

One of these methods is by reaction with bis epoxides, as disclosed in U.S. Pat. No. 2,990,396. This patent discloses the reaction of polyoxyalkylene polyols with an organic polyepoxide compound. Wide ranges of products are obtained depending upon the ratio of polyepoxide to polyoxyalkylene polyol. Each time an interaction of an alcohol group of the polyoxyalkylene polyol with an epoxy group occurs, a secondary alcohol group is created which can react with epoxide to provide cross-linking. This is particularly the case when amount of polyepoxide is in a large excess over equivalent amounts, and the patent is directed primarily to these cross-linked products.

SUMMARY OF THE INVENTION

It has now been found that excellent high molecular weight polyoxyalkylene polyols are obtained when cross-linking is minimized. In this way, high molecular weight polyoxyalkylene polyols are prepared which are closely related to the structure of high molecular weight polyoxyalkylene glycols, except that additional secondary alcohol groups are provided at fixed spaced locations on the long chain molecules.

In accordance with the process form of the invention, a polyoxyalkylene glycol is provided in the complete dialcoholate form. Then the dialcoholate is reacted with a diepoxy compound in substantially equivalent amounts under anhydrous conditions. Preferably, the diepoxy compound is an alkylene glycol bis glycidyl ether, or a polyoxyalkylene glycol bis glycidyl ether. In addition, an important process step is the bringing together of both reactants all at once under appropriate agitation. After the reaction is completed, the alcoholate groups can be converted back to alcohol groups by ion exchange or acid neutralization.

It has been found that the use of catalytic amounts of alcoholate does not provide nearly as high molecular weight product as the use of equivalent amounts for the same proportions of polyalkylene glycol and diepoxide through the ranges of excess polyalkylene glycol and equivalent amount. The differences are rather marked, with the equivalent amounts providing polymers several times larger than the catalytic amounts. Studies of the structures show that the catalytic amounts provide branched structures whereas equivalent amounts of alcoholates provide nearly straight chain structures even up to equal proportions of reactants. Excess diepoxide will theoretically provide branching, since the primary alcohol sites are used up by the reaction of equivalent amounts.

Thus it is a primary object of this invention to provide very high molecular weight polyoxyalkylene polyols characterized by long, primarily straight, chain structures. This is achieved by combining three process features in the polymerization reaction. First, the equivalent amounts are used of alkali, i.e., complete conversion of the glycol alcohols to dialcoholates. Second, substantially equivalent amounts of the dialcoholates and diepoxides are used. Finally, all of the diepoxide and the dialcoholate are added substantially all at once with immediate mixing. When these conditions are observed, branch reactions are minimized, and very high molecular weight products are obtained.

DESCRIPTION OF THE PREFERRED EMBODIMENT

The first step in the process of the invention is the conversion of the polyoxyalkylene glycol to the corresponding dialcoholate. This step may be achieved by any of the known methods for converting alcohols of the class involved to alcoholates. Conveniently, the conversion is achieved by reaction with an alkali metal such as sodium, potassium or lithium.

The polyoxyalkylene glycols utilized in this invention are those having the formula:

in which R is hydrogen or methyl, and $n$ is an integer high enough to provide a molecular weight for the glycol in excess of 500. It will be appreciated that the molecules in any composition will not be exactly alike and that the values for $n$ may be different integers and will be expressed as an average. Similarly, R may be hydrogen and methyl in the same molecule and the proportions will again be expressed as an average. Thus the class includes polyoxyethylene glycol, polyoxypropylene glycol and polyoxyalkylene glycols in which the alkylene groups are a mixture of ethylene and propylene. These mixed groups may be at random or in blocks. Such compositions are well known and many different ones are available commercially.

The conversion of the alcohol groups to alcoholate groups is preferably carried out by contacting the polyoxyalkylene glycol with an alkali metal in an organic solvent inert to the reactants. Typically, the reaction is carried out in a nitrogen atmosphere under anhydrous conditions to protect the alkali metal and minimize formation of undesirable alkali metal oxides and hydroxides. After the conversion is achieved, compounds are obtained which have the general formula:

wherein M is an alkali metal such as sodium, potassium or lithium, R is hydrogen or methyl and $n$ is an integer high enough to provide a molecular weight in excess of about 500.

The diepoxy compounds utilized in this invention include ethers having terminal epoxy groups. This class of diepoxide has been found to provide the predominantly long chain products obtainable by this invention. Thus suitable epoxides may be expressed by the formula:

Straight chain products prepared according to the reaction of the invention would have the following formula:

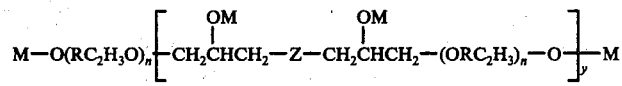

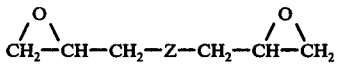

wherein Z is —O—; —O(CH$_2$)$_p$—O— where $p$ is 2–10; or —O(RC$_2$H$_3$-O)$_{\overline{m}}$, where R is hydrogen or methyl, and m is an integer from 1 to 5. The preferred diepoxides are the bis glycidyl ethers of glycols such as ethylene glycol, propylene glycol, diethylene glycol, 1,4-butanediol and the like because they provide units in the final chain similar to those in the polyoxyalkylene glycol reactant.

with y being a large integer, and M, R, Z and n being as defined above.

The last step is the conversion of the alcoholate back to the alcohol form. This may be achieved by any known procedure, such as by cation exchange or simply by acid neutralization. After reconversion, the theoretical formula would be

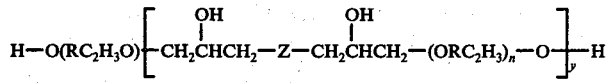

By way of illustration, it is believed that the following reaction mechanism occurs with the first reaction being as follows:

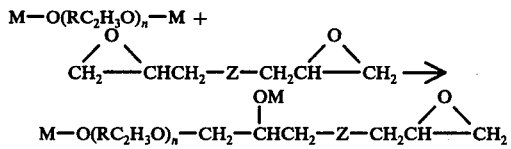

with R, Z, n and y being as hereinabove defined.

When the reaction process is carried out in acccordance with the invention, it is believed the high molecular weight product obtained is substantially composed of straight chain molecules. However, it is likely that at least some branching occurs, and the exact structures are likely to vary somewhat.

After this coupling, it is noted that a secondary alcoholate group is formed. However, any coupling on this secondary alcoholate group will produce undesirable branching. It will also be appreciated that if the amount of diepoxide is substantially less than equivalent the reaction will terminate at a lower molecular weight because the diepoxide will be used up. For example, an equivalent ratio of 0.5:1.0 should provide an average product containing two polyoxyalkylene glycol units and one unit from the diepoxide, and this is true with or without branching. On the other hand, if the ratio of diepoxide is substantially greater, say 2:1, considerable branching will occur.

When the ratio of reactants is equivalent, it is possible to obtain very high molecular weights. However, this can only happen when branch reactions are minimized, because branch reactions use up the diepoxide equivalence and cause a reduced molecular weight product.

It has been found that when the reaction of polyoxyalkylene glycol and diepoxides of the class defined are reacted with catalytic amounts of an alkali metal such as sodium, considerable branch reactions occur. When equivalent amounts of reactants are used, equivalent amounts of alkali metal provide molecular weights many times as high as with catalytic amounts, with the other reaction conditions being the same. In addition, it is found that if the diepoxide is added gradually, considerable reduction in molecular weight occur. Accordingly, the gradual addition of one reactant to another also causes branch reactions. Therefore, it is important to combine these reactants substantially all at once with rapid mixing.

In general, it is preferred to carry out the reaction in the presence of an organic solvent which is inert to the reactants. However, it is possible to carry out the process without using any solvent. Typical solvents that may be employed include xylene, toluene, the diethyl ethers of ethylene and diethylene glycol, and dioxane. The reaction temperature is not critical, and may range from about 25° C. to about 250° C. Preferably, the temperature is kept between 50° C. and 150° C., and is conveniently carried out at the reflux temperature of the mixture in the solvent utilized. The pressure is not critical, and therefore the reaction will usually be conducted at atmospheric pressure.

Typically, the reaction will be carried out in a nitrogen atmosphere. In addition, care should be taken to retain all ingredients in an anhydrous condition until the final step of converting the alcoholate groups back to alcohol.

The products obtained are not only of high molecular weight, but are generally water soluble. This is true even with products made from certain polyoxypropylene polyols, which are hydrophobic as starting materials, probably due to the higher oxygen:carbon ratio in the selected diepoxides used and the secondary alcohol groups. Therefore, the highly viscous products may be used as hydrolubes. In addition, the products may be used for making further resins through the polyol groups such as polyesters and polyurethanes. The products also have good lubricating qualitites, and may be used as suspending, thickening, dispersing, and coagulating agents in aqueous solutions.

The invention described above is more fully illustrated in the following specific examples, in which parts are by weight unless otherwise indicated. The examples are to be interpreted as illustrative only and not in a limiting sense.

EXAMPLE 1

A 1-liter, four-neck flask is provided with a stirrer, nitrogen inlet, a condenser and a collector for azeotrope. 100 grams (0.1 mole) of a polyoxypropylene glycol of about 1000 molecular weight and 400 milliliters of xylene are added to the flask. The mixture is refluxed for about one hour under a nitrogen atmosphere and agitation by stirring to remove traces of water. Then, 4.6 grams (0.2 mole) of sodium metal are added slowly in small pieces and reacted for approximately 6 hours under reflux. A solution of 17.4 grams (0.1 mole) of glycol bis glycidyl ether and 80 milliliters of dry xylene are added all at once. A viscous product is formed quickly, and the reaction mixture is kept for 30 minutes under weak reflux to complete the reaction. This viscous reaction product is then purified by ion exchange. All solvents are evaporated and a yellow, very viscous, water-soluble oil is obtained.

The product is obtained in a yield of 116.6 grams with the maximum theoretical yield being 117.4 grams. The Gardner Viscosity of the product is 14,800–38,000 CST, and the cloud point (1%) is 21°–22° C.

EXAMPLES 1 a–1 k

The procedure of Example 1 is repeated a number of times utilizing the same reactants, but varying the amounts of alkali to illustrate the difference between equivalent amounts and catalytic amounts. In addition, the proportion of reactants, method of addition, and amount of solvent was also varied. The results of these examples are shown in Table I below.

Table I

| Example | Polypropylene Glycol (gms.) | Na (gms.) | Glycol Bis Glycidyl Ether (gms.) | Xylene, (ml.) | Reaction, Time | Gardner Viscosity, CST |
| --- | --- | --- | --- | --- | --- | --- |
| 1 a. | 100 | 4.6 | 15.3 | 400 | 30 min. | 14,800 |
| 1 b. | 100 | 4.6 | 15.8 | 1000 | 1 hr. | 3,620 |
| 1 c. | 100 | 4.6 | 7.5 | 400 | 30 min. | 627 |
| 1 d. | 100 | 4.6 | 11.8 | 400 | 30 min. | 1,760 |
| 1 e. | 100 | 0.43 | 15.3 | 400 | 90 min. | 884 |
| 1 f. | 100 | 0.58 | 24.2 | 400 | 90 min. | 2,270 |
| 1 g. | 100 | 0.46 | 15.3 | 400 | Dropwise, then 60 min. | 627 |
| 1 h. | 100 | 4.6 | 15.3 | 400 | Dropwise, then 60 min. | >6,340 |
| 1 i. | 100 | 4.6 | 19.3 | 400 | 10 min. | Gel |
| 1 j. | 100 | 0.46 | 8.7 | 400 | 90 min. | 400–435 |
| 1 k. | 500 | 22.6 | 65 | None | 90 min. | ~59,000 |

In Examples 1 a–1 d and 1 h, 1 i, and 1 k equivalent amounts of sodium are used; while catalytic amounts are used in Examples 1 e, 1 f, 1 g, and 1 j. A comparison of results illustrates that catalytic amounts of sodium do not provide the desired high molecular weight products. Note that Example 1 a (which has 88% of the equivalent amount of glycol bis glycidyl ether) and Example 1 e differ only in the amount of sodium and the length of reaction time (1 e kept longer), yet the viscosity of the product of Example 1 a is more than 16 times as high as that of Example 1 e. Example 1 b illustrates the effect of excessive solvent, and Examples 1 c and 1 d illustrate the reduction in viscosity when the amounts of glycol bis glycidyl ether is substantially less than the equivalent amount. Examples 1 g and 1 h show the loss in viscosity when the glycol bis glycidyl ether is added dropwise rather than all at once. Example 1 g shows a further decrease in viscosity when the second reactant is added dropwise and catalytic amounts of alkali are used. Comparison of 1 g and 1 e shows reduction in viscosity when the glycol bis glycidyl ether is added dropwise and catalytic amounts of alkali are used. Example 1 i shows the production of a gel very quickly when equivalent amounts of alkali are used and a slight excess (11%) over the equivalent amount of glycol bis glycidyl ether is used. Example 1 k illustrates that the reaction may be carried out without the use of solvents, if desired.

From the above examples it is seen that the desired high molecular weight compound mixture is obtained by observing three important procedures. First, the amount of alkali used is an equivalent amount rather than a catalytic amount. Second, the amount of glycol bis glycidyl ether shoud be substantially equivalent. Last, the equivalent amounts of glycol bis glycidyl ether and alcoholate should be combined all at once. It is also to be noted that the final product is water soluble even though it is made from hydrophobic polypropylene glycol.

EXAMPLE 2

A 2-liter, four-neck flask is equipped with a stirrer, nitrogen inlet, a condenser and a collector for azeotrope. 400 grams of a polyoxyalkylene glycol and 800 milliliters of xylene are added to the flask. The polyoxyalkylene glycol is a block copolymer of ethylene oxide and propylene oxide having an average molecular weight for its polyoxypropylene blocks of 1750, and having about 80% (by weight) of polyoxyethylene in the total molecule as the terminal portions thereof. Such polyoxyalkylene glycol is a surfactant sold by BASF Wyandotte Corporation of Wyandotte, Michigan, under their PLURONIC trademark as "PLURONIC F-68" polyol. Thus the molecular weight of the polyoxyalkylene glycol is about 8750, and 400 grams is about 0.046 mole, however, it will be appreciated that the molecular weight is an average and that it will vary somewhat. This mixture is refluxed under a nitrogen atmosphere with stirring to remove water traces.

To the refluxed solution is then added 2.3 grams of sodium metal (0.1 mole), and the mixture is reacted for about 6 hours under reflux. Then 7.83 grams (0.09 eq. wt.) of glycol bis glycidyl ether dissolved in 50 milliliters of dry xylene is added all at once at 140° C. and reacted for about 30 minutes. The reaction mixture becomes very viscous. The alcoholate is then neutralized by adding 10 grams of concentrated hydrochloric acid in 500 milliliters of isopropanol. After evaporation, a tough, water-soluble resin is obtained.

The viscosity at a concentration of 5% in water is as follows: Brookfield — 20° C., Spindle No. 2, 20 RPM =

36 centipoises; Relative Viscosity $\eta v$ — 25° C., Tube 200 = 128.5 seconds. The cloud point (1%) is 56°–57° C.

EXAMPLES 2 a–2 f

The procedure of Example 2 is repeated a number of times utilizing the same reactants, but varying the amounts of alkali to illustrate the difference between equivalent amounts and catalytic amounts. In addition, the proportion of reactants and type of solvent was also varied. The results of these examples is shown in Table II below.

Table II

| Example | Amount of Sodium (gms.) | Amount of Diepoxide (gms.) | Solvent 800 ml. | $\eta\Gamma$ Tube 200 25° C., sec. | Brookfield Sp. 2, 20° C 20 RPM, CPS | CP (1%) |
| --- | --- | --- | --- | --- | --- | --- |
| 2 a | .23 | 4.35 | Xylene | 24.2 | 14 | 98–99° C |
| 2 b | .23 | 8.7 | Xylene | 30.2 | 14 | 84–85° C |
| 2 c | 2.3 | 4.35 | Xylene | 36.5 | 14 | 74–75° C |
| 2 d | 2.3 | 6.52 | Xylene | 60.0 | 16 | 58–59° C |
| 2 e | 2.3 | 8.7 | Xylene | 236.4 | 58 | 56–56.5° C |
| 2 f | 2.3 | 7.83 | Toluene | 172.8 | 42 | 56.5–57° C |

Table II illustrates that catalytic amounts of alkali do not provide the desired high molecular weight products, whereas substantially equivalent amounts do. In addition, the data shows that the amount of diepoxide should be substantially equivalent to the amount of alcoholate.

From the foregoing description, it is seen that we have shown and described a new composition and process for preparing same. While we have described herein certain embodiments of our invention, we intend to cover as well any change or modification therein which may be made without departing from the spirit and scope of the appended claims.

The embodiments of the invention in which an exclusive property or privilege is claimed are defined as follows:

1. A process for preparing a high molecular weight water soluble polyoxyalkylene polyol, which comprises the following steps in the order given,
   converting a polyoxyalkylene glycol having a molecular weight greater than about 500 to the dialkalialcholate form in substantially complete conversion,
   reacting said alcoholate with an alkylene glycol bis glycidyl ether or a polyoxyalkylene glycol bis glycidyl ether under anhydrous conditions at a temperature of from about 25° to about 250° C., said reactants being combined all at once in equivalent amounts under conditions of mixing for a time sufficient to complete the reaction, and
   converting the alcoholate groups in the final mixture to alcohol groups, whereby a primarily straight chain high molecular weight product is obtained.

2. A process for preparing a high molecular weight polyoxyalkylene polyol, as defined in claim 1, in which the reaction is carried out in the presence of an organic solvent, which is inert to the reactants and reaction products.

3. A process for preparing a high molecular weight polyoxyalkylene polyol, as defined in claim 1, in which the alcoholate reactant has the formula:

$$M-O(RC_2H_3-O)_n-M$$

wherein R is hydrogen or methyl, n is an integer, and M is sodium, potassium or lithium.

4. A process for preparing a high molecular weight polyoxyalkylene polyol, as defined in claim 3, in which R is methyl.

5. A process for preparing a high molecular weight polyoxyalkylene polyol, as defined in claim 3, in which at least 80% of the R groups are hydrogen.

6. A process for preparing a high molecular weight polyoxyalkylene polyol, as defined in claim 1, in which the diepoxide is glycol bis glycidyl ether.

7. A high molecular weight, water soluble primarily straight chain, polyoxyalkylene polyol obtained by combining equivalent amounts of an alcoholate having the formula:

$$M-O(RC_2H_3-O)_n-M$$

wherein R is hydrogen or methyl, M is sodium, potassium, or lithium, n is an integer having a sufficient value to provide an average molecular weight of the glycol form of the alcoholate above about 500, and a diepoxy compound having the formula:

$$\underset{CH_2-CH-CH_2-Z-CH_2-CH-CH_2}{\overset{O\qquad\qquad\qquad O}{\diagup\diagdown\qquad\qquad\diagup\diagdown}}$$

wherein Z is —O—; —O(CH$_2$)$_p$—O— where p is 2–10; or —O(RC$_2$H$_3$—O)$_m$, where R is hydrogen or methyl and m is an integer from 1 to 5, with the reactants combined all at once with mixing at a temperature of from about 25° to about 250° C., and with the reaction being carried out under substantially anhydrous conditions, and replacing the M groups with hydrogen by ion exchange or acid neutrilization.

8. A high molecular weight polyoxyalkylene polyol, as defined in claim 7, in which R is methyl.

9. A high molecular weight polyoxyalkylene polyol, as defined in claim 7, in which at least 80% of the R groups are hydrogen.

10. A high molecular weight polyoxyalkylene polyol, as defined in claim 7, in which the diepoxide is glycol bis glycidyl ether.

* * * * *